United States Patent
Dykstra et al.

(10) Patent No.: US 10,648,317 B2
(45) Date of Patent: May 12, 2020

(54) IMPROVING FAULT DETECTABILITY THROUGH CONTROLLER RECONFIGURATION

(71) Applicant: Halliburton Energy Services, Inc., Houston, TX (US)

(72) Inventors: Jason D. Dykstra, Spring, TX (US); Zhijie Sun, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 590 days.

(21) Appl. No.: 15/500,881

(22) PCT Filed: Oct. 22, 2015

(86) PCT No.: PCT/US2015/056962
§ 371 (c)(1),
(2) Date: Jan. 31, 2017

(87) PCT Pub. No.: WO2017/069766
PCT Pub. Date: Apr. 27, 2017

(65) Prior Publication Data
US 2017/0268323 A1   Sep. 21, 2017

(51) Int. Cl.
*E21B 44/00* (2006.01)
*E21B 34/16* (2006.01)
*G05B 23/02* (2006.01)
*E21B 21/01* (2006.01)
*E21B 33/06* (2006.01)
(Continued)

(52) U.S. Cl.
CPC .............. *E21B 44/00* (2013.01); *E21B 21/01* (2013.01); *E21B 33/06* (2013.01); *E21B 34/16* (2013.01); *E21B 41/0092* (2013.01); *E21B 47/00* (2013.01); *E21B 47/06* (2013.01); *E21B 47/065* (2013.01); *E21B 47/10* (2013.01);
(Continued)

(58) Field of Classification Search
None
See application file for complete search history.

(56) References Cited

U.S. PATENT DOCUMENTS 8,200,346 B2 * 6/2012 Thiele .................... G05B 17/02
700/44
2002/0148646 A1 * 10/2002 Schultz .................. E21B 12/02
175/40
(Continued)

OTHER PUBLICATIONS https://stats.stackexchange.com/guestions/153599/recurrent-vs-recursive-neural-networks-which-is-better-for-nlp (Year: 2015).*
(Continued)

*Primary Examiner* — Roy Y Yi
(74) *Attorney, Agent, or Firm* — McGuireWoods LLP

(57) ABSTRACT

A method of detecting a fault in an oil and gas apparatus controlled by a controller is provided. The method includes collecting a test set of data using a sensor proximate to an oil and gas apparatus during the operation of the oil and gas apparatus under test operating conditions, the test set of data being associated with an operating parameter of the controller, determining a percentage of the test set of data that falls outside a normal operation region of the oil and gas apparatus, and configuring the controller in response to the percentage being between a fault-free percentage threshold and a fault percentage threshold.

20 Claims, 8 Drawing Sheets

(51) Int. Cl.
*E21B 41/00* (2006.01)
*E21B 47/00* (2012.01)
*E21B 47/06* (2012.01)
*E21B 47/10* (2012.01)
*G01V 11/00* (2006.01)
*G05B 19/048* (2006.01)

(52) U.S. Cl.
CPC .......... *G01V 11/002* (2013.01); *G05B 19/048* (2013.01); *G05B 23/0289* (2013.01); *G05B 2219/24033* (2013.01)

(56) References Cited

U.S. PATENT DOCUMENTS

| | | | |
|---|---|---|---|
| 2008/0164062 A1* | 7/2008 | Brackin | E21B 21/103 175/24 |
| 2009/0146599 A1 | 6/2009 | Zhou et al. | |
| 2009/0299654 A1 | 12/2009 | Garvey et al. | |
| 2010/0299126 A1 | 11/2010 | Chugunov et al. | |
| 2011/0024189 A1 | 2/2011 | Saeed | |
| 2011/0241888 A1 | 10/2011 | Lu et al. | |
| 2015/0060053 A1 | 3/2015 | Chugunov et al. | |
| 2015/0167392 A1 | 6/2015 | Sugiura | |

OTHER PUBLICATIONS https://www.learner.org/courses/againstallodds/pdfs/AgainstAllOdds_StudentGuide_Unit08.pdf.*
https://revisionmaths.com/gcse-maths-revision/statistics-handling-data/standard-deviation.*
European Search Report dated Feb. 19, 2019; European Patent Application No. 15906844.4.
Gulsrud, Thor Ole, Roar NybØ, and Knut Steinar BjØrkevoll. "Statistical method for detection of poor hole cleaning and stuck pipe." Offshore Europe. Society of Petroleum Engineers, 2009.
International Search Report and Written Opinion dated Jul. 15, 2016; International PCT Application No. PCT/US2015/056962.

* cited by examiner

IMPROVING FAULT DETECTABILITY THROUGH CONTROLLER RECONFIGURATION

BACKGROUND

1. Field

This invention relates to methods and systems for detecting a fault in an oil and gas apparatus controlled by a controller.

2. Description of the Related Art

A controller may control one or more physical system components to achieve a set of common objectives. The controller may be designed to reliably control the physical system components in the presence of external disturbances, variations among physical components due to manufacturing tolerances, and changes in commanded input values for controlled output values, such as, for example, drilling fluid density, cement mixture density, and other fluid properties. The controller may also be designed to remain stable and avoid oscillations within a range of specific operating conditions.

In a wellbore environment, the controller may be used to control a physical system component such as an oil and gas apparatus used for mixing materials to achieve a desired mixture output or for providing the mixture downhole. For example, when drilling an oil or gas well, it is common to install a tubular casing into the wellbore, mix materials to make a cement mix, and pump the cement mix into place cementing the casing in place against the wellbore wall. In another embodiment, the controller may be used to control an oil and gas apparatus used for providing drilling fluid when drilling an oil or gas well. For example, the controller is used to control oil and gas apparatuses that mix materials to make the drilling fluid and pump the drilling fluid which is sometimes called a drilling mud. The drilling fluid provides hydrostatic pressure to prevent formation fluids from entering into the wellbore, keeps a drill bit cool and clean during drilling, carries out drill cuttings, and suspends the drill cuttings while drilling is paused and when the drilling assembly is brought in and out of the hole.

Oil and gas processing equipment that supports wellbore servicing operations, such as cementing or drilling, may be designed to work with the controller configured to provide a desired volumetric flow rate of mixed cement or drilling fluid having desired properties such as density, pressure, and flow rate. In particular, in the case of cementing, a controller may control oil and gas apparatuses such as valves that allow the in-flow of dry cement material and water to obtain the desired cement mixture density and desired cement mixture volumetric flow rate. The controller may operate, by monitoring the cement mixture flow rate and density, and by regulating an in-flow water valve and an in-flow dry cement material valve. Further, in the case of drilling, a controller may control oil and gas apparatuses such as valves that allow the in-flow of drilling fluid components and water to obtain the desired drilling fluid density and desired drilling fluid volumetric flow rate. The controller may operate, for example, by monitoring the drilling fluid flow rate and density, and by regulating an in-flow water valve and an in-flow drilling fluid component valve. During cementing or drilling, a fault in an oil and gas apparatus may occur which may be detected by the controller allowing for corrective measures to be determined and implemented.

Figure 1:
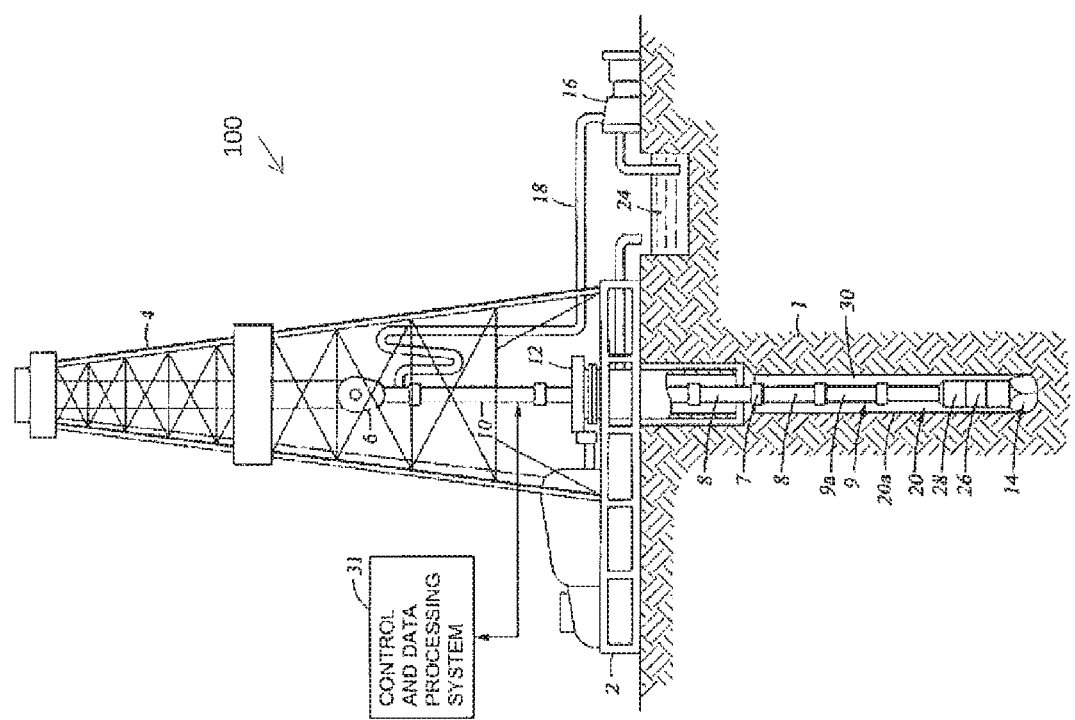
FIG. 1 is an illustrative environment of oil and gas processing equipment that includes a number of oil and gas apparatuses and a controller according to one or more embodiments of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

In the following detailed description of the illustrative embodiments reference is made to the accompanying drawings that form a part thereof and is provided to assist the reader in gaining a comprehensive understanding of the methods, apparatuses, and/or systems described herein. These embodiments are described in sufficient detail to enable those skilled in the art to practice the invention, and it is understood that other embodiments may be utilized and that logical structural, mechanical, electrical, and chemical changes may be made without departing from the spirit or scope of the invention. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order.

To avoid detail not necessary to enable those skilled in the art to practice the embodiments described herein, the description may omit certain information known to those skilled in the art. Also, the respective descriptions of well known functions and constructions may be omitted for increased clarity and conciseness. Further, the description of an exemplary embodiment of the present invention is merely an exemplary embodiment for structural and functional explanation of the present invention. The following detailed description is, therefore, not to be taken in a limiting sense, and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion and thus should be interpreted to mean "including, but not limited to." Unless otherwise indicated, as used throughout this document, "or" does not require mutual exclusivity.

Terms such as "first" and "second," etc., may be used to distinguish one component from another. Additionally, it will be understood that when an element is referred to as being "connected to" or "communicatively connected to" another element, it can be directly connected to the other element, wirelessly connected to the other element, or intervening elements may also be present. In contrast, when an element is referred to as being "directly connected to" another element, no intervening elements are present. Meanwhile, other expressions describing relationships between components such as "between", "immediately between" or "adjacent to" and "directly adjacent to" may be construed similarly.

The following description describes methods and systems for detecting a fault in an oil and gas apparatus controlled by a controller. Specifically, methods and systems are disclosed that can reveal a fault more accurately and sooner by reconfiguring one or more controllers that control the oil and gas processing equipment that includes one or more oil and gas apparatuses.

FIG. 1 shows oil and gas processing equipment 100 that includes a number of oil and gas apparatuses that are communicatively connected to one or more controllers. Particularly, FIG. 1 shows a drilling platform 2 equipped with a derrick 4 that supports a hoist 6. Drilling of a borehole, for example, the borehole 20, is carried out by a number of oil and gas apparatuses, for example, a string of drill pipes 8 connected together by "tool" joints 7 so as to form a drill string 9. Additional oil and gas apparatuses, such as sensors, can be placed along the drill string 9 to collect a normal set of data when operating under normal operating conditions and a test set of data when operating under test operating conditions. The hoist 6 suspends a kelly 10 that is used to lower the drill string 9 through rotary table 12. Connected to a lower end of the drill string 9 is a drill bit 14. The drill bit 14 is rotated, and the drilling of the borehole 20 is accomplished by rotating the drill string 9, by use of a downhole motor (not shown) located near the drill bit 14, or by a combination of the two. Drilling fluid, sometimes referred to as "mud", is pumped, by mud recirculation equipment 16, through supply pipe 18, through drilling kelly 10, and down through interior throughbore of the drill string 9. The mud exits the drill string 9 through apertures, sometimes referred to as nozzles on the drill bit 14. The mud then travels back up through the borehole 20 via an annulus 30 formed between an exterior side surface 9a of the drill string 9 and a wall 20a of the borehole 20, through a blowout preventer and a rotating control device (not shown), and into a mud pit 24 located on the surface. On the surface, the drilling fluid is cleaned and then returned into the borehole 20 by the mud recirculation equipment 16 where it is reused. The drilling fluid is used to cool the drill bit 14, to carry cuttings from the base of the borehole 20 to the surface, and to balance the hydrostatic pressure in the subsurface earth formation 1 being explored. The drill bit 14 is part of a bottom-hole assembly ("BHA") that may include one or more logging while drilling (LWD) tools 26 and a downhole controller and telemetry transmitter 28.

Sensors (not shown) may be placed adjacent to or within any of the above oil and gas apparatuses to collect the normal and test sets of data. Each of the one or more sensors connected to the oil and gas processing equipment can acquire information regarding the subsurface earth formation 1, the oil and gas apparatuses that are within a certain proximity of the sensors, and fluids that are within a certain proximity of the sensors. It is fully contemplated that the one or more sensors may include any number of different types of sensors or other devices designed to acquire different types of information regarding the subsurface earth formation 1, oil and gas processing equipment, and fluids passing through the oil and gas processing equipment.

In one embodiment, as sensors placed downhole acquire information regarding their surroundings, the information may be processed and stored by the downhole controller and telemetry transmitter 28. Alternatively, or in addition, the information may be transmitted by the downhole controller and telemetry transmitter 28 to a telemetry receiver (not shown) at the surface and then communicated to a control and data processing system 31 that includes a controller. Downhole controller and telemetry transmitter 28 may employ any of various telemetry transmission techniques to communicate with the surface, including modulating the mud flow in the drill string 9, inducing acoustic vibrations in the drill string walls, transmitting low-frequency electromagnetic waves, using a wireline transmission path, and storing the collected data signal for retrieval when the drill string 9 is removed from the borehole 20. The telemetry receiver detects the transmitted signals and passes them to the control and data processing system 31 which, for ease of description, is shown in FIG. 1 as being schematically coupled to the drilling kelly 10. The control and data processing system 31 may record and/or process the received data signals to derive information regarding the subsurface earth formation 1, the oil and gas processing equipment downhole, and the fluids downhole. In other embodiments, the control and data processing system 31 including the controller, may be located anywhere along the drill string 9 including, but not limited to, at the drill bit 14, in the LWD tool 26, in the controller and telemetry transmitter 28, at the surface above the rotary table 12 as shown, off-site, or some combination thereof.

In some embodiments, the control and data processing system 31 may be further configured to issue commands to the oil and gas processing equipment 100 to alter the operating parameters using the controller in the control and data processing system 31. In other embodiments, a controller is collocated near a sensor or near oil and gas processing equipment that the controller controls. Operating parameters are variables that control not only the oil and gas processing equipment 100 but all the fluids that may be sent downhole such as cement mix and drilling fluid. For example, some operating parameters include cement mix component amounts, drilling fluid component amounts, fluid flow rate, fluid pressure, rotation, torque, thrust pressure, retaining pressure, temperature, drill bit placement, and weight on bit (WOB).

Figure 2:
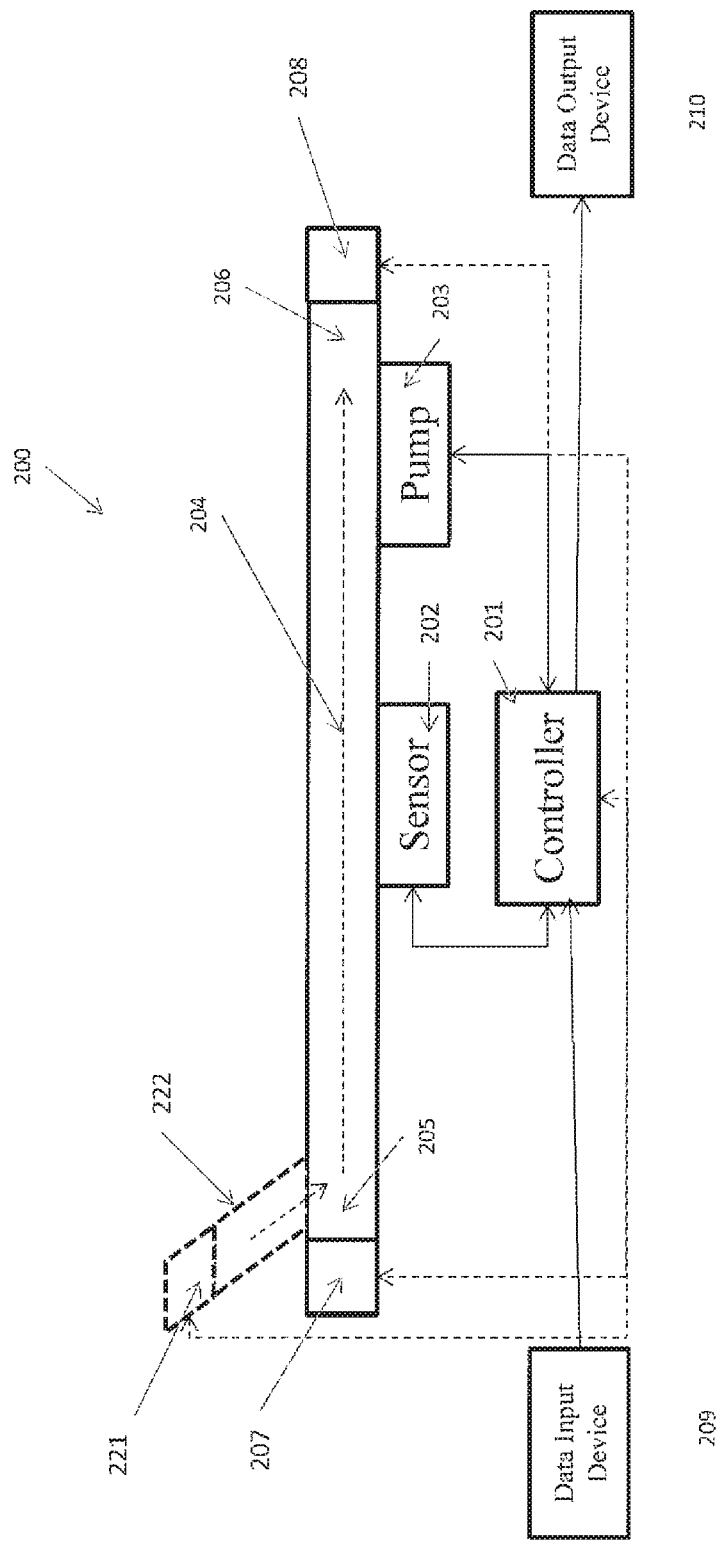
FIG. 2 is a block diagram of an oil and gas apparatus control system according to one or more embodiments of the present disclosure.

FIG. 2 shows a block diagram of an oil and gas apparatus control system 200 according to one or more embodiments. The oil and gas apparatus control system 200 may be located anywhere along a fluid flow path of the oil and gas processing equipment 100 shown in FIG. 1. As shown in FIG. 2, the oil and gas apparatus control system 200 includes a controller 201 that is connected to a number of different oil and gas apparatuses such as a sensor 202 and a pump 203. The sensor 202 and pump 203 are placed proximate to an enclosed chamber 204. The chamber 204 has an inlet 205 at a first end and an outlet 206 at a second end. The chamber 204 further includes an input valve 207 connected to the inlet 205 and an output valve 208 connected to the outlet 206. The controller is connected to the input valve 207 and output valve 208. The controller 201 is also connected to other oil and gas apparatuses such as a data input device 209 and a data output device 210. In another embodiment, the controller 201 is also connected to other oil and gas apparatuses such as a second input valve 221 and second chamber 222.

The controller 201 is placed so that it can remain communicatively connected by a direct connection, a wired connection, wirelessly, or a combination thereof to the one or more oil and gas apparatuses. Thus, the controller 201 can be positioned downhole, at the surface, at a remote location away from drill site, near the sensor 202, or near the pump 203. The controller 201 can transmit and receive different signals from each of the oil and gas apparatuses. Controller 201 is a microcontroller configured with a firmware implemented microinstruction set to control the operation of oil and gas processing equipment 100. Alternatively, controller 201 may be an ASIC or other logic circuitry or may be embodied by firmware or other software executed by a general or special purpose processor or computer. In either case, controller 201 may interact with memory containing a database or data store that includes any combination of models, tables, data curves, formulas, normalization and calibration schemes, or other representations of data utilized by controller 201 to control oil and gas processing equipment 100.

The sensor 202 is positioned within a sensor range of a target that is to be monitored by the sensor 202. In the present embodiment, the target is a fluid, such as a cement mix or drilling fluid, that travels through a chamber 204 of the oil and gas apparatus control system 200. Thus, as shown in FIG. 2, the sensor 202 is placed adjacent to the chamber 204 that carries the fluid. Alternatively, in another embodiment, the target may be the pump 203, the input valve 207, the second input valve 221, the output valve 208 or any other oil and gas apparatus. The sensor 202 may be, for example, a depth-tracking sensor, flow-in tracking sensor, pressure-tracking sensor, flow-out tracking sensor, drill-monitor sensor, pit-monitor sensor, gas-detection sensor, fluid temperature sensor, fluid density sensor, and fluid conductivity sensor. The sensor 202 may be other types of specific sensors as well that correspond to the target selected for monitoring and features of the target to be monitored. In another embodiment, the oil and gas apparatus control system 200 may include a plurality of sensors that are connected to the controller 201.

The pump 203 is positioned based on the intended purpose of the pump 203. For example, in one embodiment as shown in FIG. 2, pump 203 is a circulation pump and is therefore placed proximate to the chamber 204 such that the pump 203 can move the fluid through the chamber 204 along a fluid flow path. In another embodiment the pump 203 is used as a cement mixer and is positioned proximate to the inlet 205 of the chamber 204 where the second chamber 222 connects to the chamber 204 thereby mixing the fluids that enter through each respective chamber 204 and 222.

Chamber 204 is an interior chamber extending through an oil and gas apparatus such as a pipe portion of the oil and gas apparatus control system 200 and includes an inlet 205 at a first end and an outlet 206 at a second opposite end. The pipe portion can specifically be a casing, drill string, drilling kelly, or supply pipe. The chamber 204 provides a fluid flow path through which a fluid can pass in through the inlet 205 and out the outlet 206. An input valve 207 is positioned at the inlet 205 of the chamber 204. An output valve 208 is positioned at the outlet 206 of the chamber 204. In other embodiments, the chamber 204 may be an interior chamber extending through an oil and gas apparatus such as a mixer, pump, logging while drilling tools, bottom-hole assembly, a drill bit, a blowout preventer, a rotating control device, and recirculation equipment. In another embodiment, the chamber 204 may be an annulus formed between an exterior side surface of the drill string and the wall of the borehole.

The data input device 209 is a device through which a user or master system control device can provide instructions and/or information to the controller 201. The data input device 209 may be communicatively connected to the controller 201 by a wired or wireless implementation. The data input device 209 and data output device 210 can be placed anywhere that they remain communicatively connected. Alternatively, in another embodiment, the data input device 209 may be integrally formed with the controller 201 when the controller 201 is positioned at the surface or at a remote location away from the drill site at which a user could assess the data input device 209. The data output device 210 is a device, such as a display or speaker, through which the user or master system control device can receive processed information, requests, and/or instructions from the controller 201. The data output device 210 is connected and positioned similar to the data input device 209. Alternatively, in other embodiments, the data output device 210 can be positioned at a different location from the data input device 209, or there may be multiple data output devices to which the controller 201 transmits data to. The controller 201 can receive instructions from a user and/or known modeling information for a particular oil and gas apparatuses that is being monitored for a fault.

In another embodiment the oil and gas apparatus control system 200 includes a second input valve 221 that is positioned at an inlet of a second chamber 222 whose outlet connects to the chamber 204. As shown in FIG. 2, the second chamber 222 connects near the inlet 205, but in other embodiments the second chamber 222 may be connected anywhere along the chamber 204. The second chamber 222 and second input valve 221 may be used to provide cement mix or drilling fluid components for mixing.

In other embodiments, the oil and gas apparatus control system 200 may further include other oil and gas apparatuses such as one or more of a logging-while-drilling tool, bottom-hole assembly, drill bit, blowout preventer, rotating control device, recirculation equipment, or other device provided along the chamber 204 of the oil and gas apparatus control system 200.

The oil and gas apparatus control system 200 operates under normal operating conditions defined by a range of specific operating conditions. During normal operation the controller 201 receives and processes data from multiple sources. The controller 201 also outputs one or more operating parameters to the oil and gas processing equipment such that the oil and gas processing equipment is maintained within the range of specific operating conditions. Maintaining the oil and gas processing equipment within the range is done by using one or more of the operating parameters output from the controller 201 to control, for example, an oil and gas apparatus such as the pump 203 or any of the other oil and gas apparatuses. When controlled, the pump 203 operates within system requirements that keep the pump 203 within a stable operating region that includes at least one of mechanical system stability, chemical system stability, and electrical system stability.

Faults can occur in any mechanical or electrical systems. Detection and diagnosis of faults are usually conducted based on routine operation data, which are obtained in a non-intrusive way. Some features of the test set of data are extracted statistically, which are compared with features of a normal set of data that define a normal operation region that is a region known to exist without any fault. If there is significant difference between features of test set of data and features of fault-free normal set of data, it can be concluded that at least one fault exists in the system. This standard method for fault detection is effective when fault magnitude is large enough, or alternatively, when faults have significant effects on the overall system. For example, the oil and gas processing equipment may experience a fault. The oil and gas apparatus control system 200, which can be characterized in part as a fault detection module, provides health monitoring of the oil and gas processing equipment by detecting the fault. The oil and gas apparatus control system 200 can then generate an alarm that can be sent to a user when the fault is detected. The fault can be detected from the collected data from the sensor 202 that is processed by the controller 201. The fault can manifest at any one or more points and within any one or more elements of the oil and gas processing equipment.

However, it is very often that faults occur initially with very limited effects and grow gradually over time. The system may be already adversely affected when the faults are large enough to be detected. Therefore, an approach is provided to detect faults in their early stages. By increasing detection rates of small faults, preventive actions can be engaged earlier to avoid more serious situations. For example, the fault may manifest initially such that the immediate sensor values collected by the sensor 202 do not shift enough to provide for a detection of the fault. If a fault is not obvious the oil and gas apparatus control system 200 may miss the fault or provide false alarms. To alleviate the occurrences of missed faults and false alarms, the method is provided to better detect faults. This detection can be improved by revealing fault features when plotted on a graph. Specifically, the method includes reconfiguring the controller 201 in the oil and gas apparatus control system 200 to help detect the fault. This reconfiguring of the controller 201 maintaining actual operating conditions within a control range defined by specific operating conditions for the oil and gas processing equipment.

Figure 3:
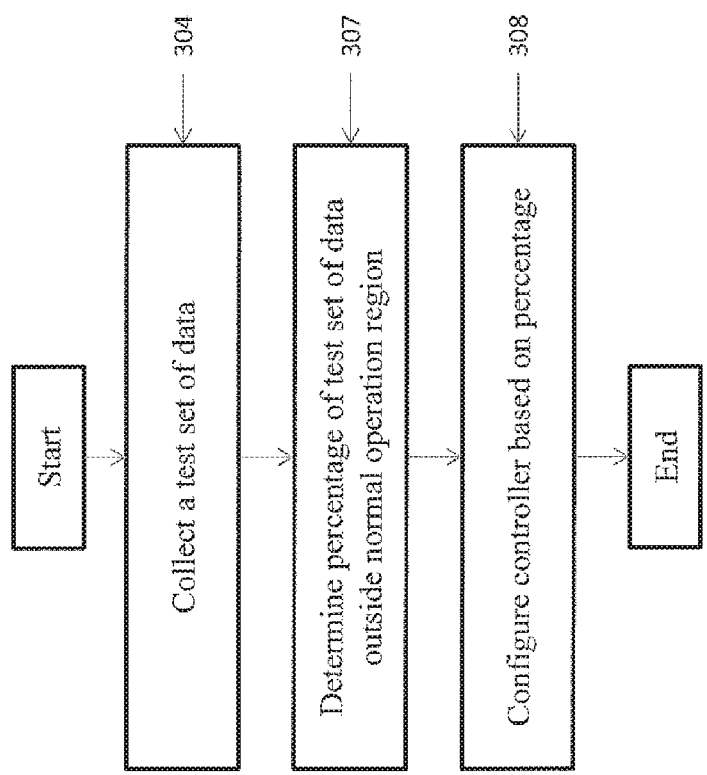
FIG. 3 is a flow chart of a method for detecting a fault in an oil and gas apparatus controlled by a controller according to one or more embodiments of the present disclosure.

FIG. 3 is a flow chart of a method for detecting a fault in an oil and gas apparatus controlled by a controller according to one or more embodiments. The method includes collecting a test set of data (operation 304). In an embodiment, the test set of data includes information that can be processed to derive one or more test set of data points that can be plotted and compared to a normal set of data points derived from a normal set of data. Collecting the test set of data is done by using a sensor proximate to the oil and gas apparatus during the operation of the oil and gas apparatus under test operating conditions. The test set of data is associated with an operating parameter of the controller. In an embodiment, the association between the test set of data and the operating parameter includes a weighted dependency of the test set of data on the operating parameter such that a change in the value of the operating parameter may change one or more values of the test set of data.

The method further includes determining a percentage of the test set of data that falls outside a normal operation region of the oil and gas apparatus (operation 307). In order to determine the percentage, a test set of data points are extracted from the test set of data based on a feature of the oil and gas apparatus. Then the extracted test set of data points are mapped along with the normal operation region. Once mapped, the percentage of the test set of data points that fall outside the normal operation region is determined.

Once the percentage is determined, the method further includes configuring the controller based on the percentage (operation 308). The controller is configured in response to the percentage being between a fault-free percentage threshold and a fault percentage threshold which normally would be an inconclusive finding. For example, when the percentage is above the fault-free percentage threshold, it can be appreciated that too many of the test set of data points fall outside the normal operation region, and therefore it cannot be concluded that the oil and gas apparatus is fault-free. Further, if the percentage is below the fault percentage threshold, it can be appreciated that too few of the test set of data points fall outside the normal operation region and therefore it cannot be concluded that the oil and gas apparatus has a fault. Thus, when the percentage is between the fault-free percentage threshold and the fault percentage threshold an inconclusive result occurs that does not indicate either way what the fault condition of the oil and gas apparatus is. When presented with inconclusive results previous systems either: (1) iterate the same testing waiting for the fault to grow or diminish on its own, (2) process the test set of data differently to view it from a different perspective in the hope of showing a distinguishing feature indicative of a fault, or (3) collect a different set of test data relating to a different feature. In addition to any of these, in the method of FIG. 3, the controller is configured and reconfigured to affect the collected test set of data thereby driving the collected test set of data toward a conclusive finding of a fault or no fault rather than only being configured or reconfigured to control the oil and gas processing equipment that includes the oil and gas apparatuses.

Such reconfiguration of the controller is accomplished by adjusting an operating parameter of the controller. The operating parameter that is selected and adjusted is the operating parameter that is associated with the test set of data. The operating parameter is associated such that when it is adjusted the test set of data will be affected as will the plotting of the derived test set of data points when a fault is present. The reconfiguring of the controller is done while maintaining an oil and gas apparatus response within system requirements using the operating parameter. The oil and gas apparatus is also kept within a stable operating region that includes at least one or more of mechanical system stability, chemical system stability, and electrical system stability. Specific examples of configuring using different controllers are provided below in FIGS. 6A-6C.

In one embodiment, the controller may be recursively reconfigured until the test set of data, which is collected and plotted between each reconfiguring, diverges from the normal operation region. This divergence specifically causes the percentage of test set of data that is outside the normal operation region to be equal to or greater than the fault percentage threshold indicating that the fault has been detected.

Figure 4:
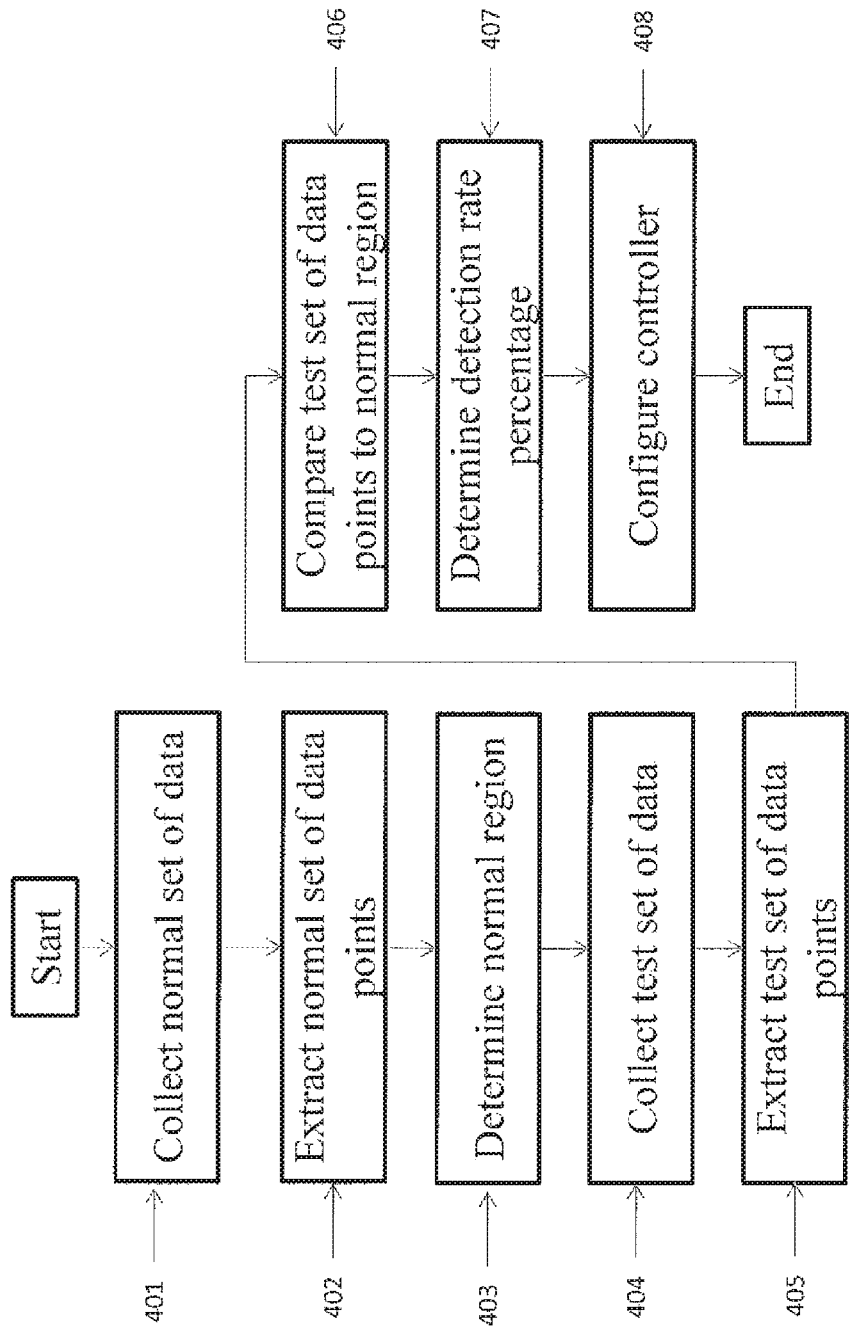
FIG. 4 is a flow chart of a method for detecting a fault in an oil and gas apparatus controlled by a controller according to one or more embodiments of the present disclosure.

FIG. 4 shows a flow chart of a method for detecting a fault in an oil and gas apparatus controlled by a controller similar to the above-described method with some additional operations and details in accordance with one or more embodiments. The method includes collecting a normal data set (operation 401). Collecting the normal set of data is done by using a sensor proximate to the oil and gas apparatus during the operation of the oil and gas apparatus under normal operating conditions. The normal set of data is associated with an operating parameter of the controller. The method then extracts a normal set of data points based on a feature of the oil and gas apparatus from the normal set of data (operation 402). Then the method goes on to determine a normal operation region based on a mapping of the normal set of data points (operation 403). Next, the method includes collecting a test set of data (operation 404) similar to operation 304 of FIG. 3. Then a test set of data points are extracted based on the feature of the oil and gas apparatus from the test set of data (operation 405). The method also includes comparing the test set of data points to the normal region (operation 406) which may be done my mapping both the test set of data points and the normal region. The method then determines a detection rate percentage (operation 407). The detection rate percentage is defined by the test set of data that falls outside the normal operation region of the oil and gas apparatus. Once the percentage is determined, the method further includes reconfiguring the controller based on the percentage (operation 408) to drive data collected by the sensor closer to either threshold similar to operation 308 of FIG. 3.

Figure 5:
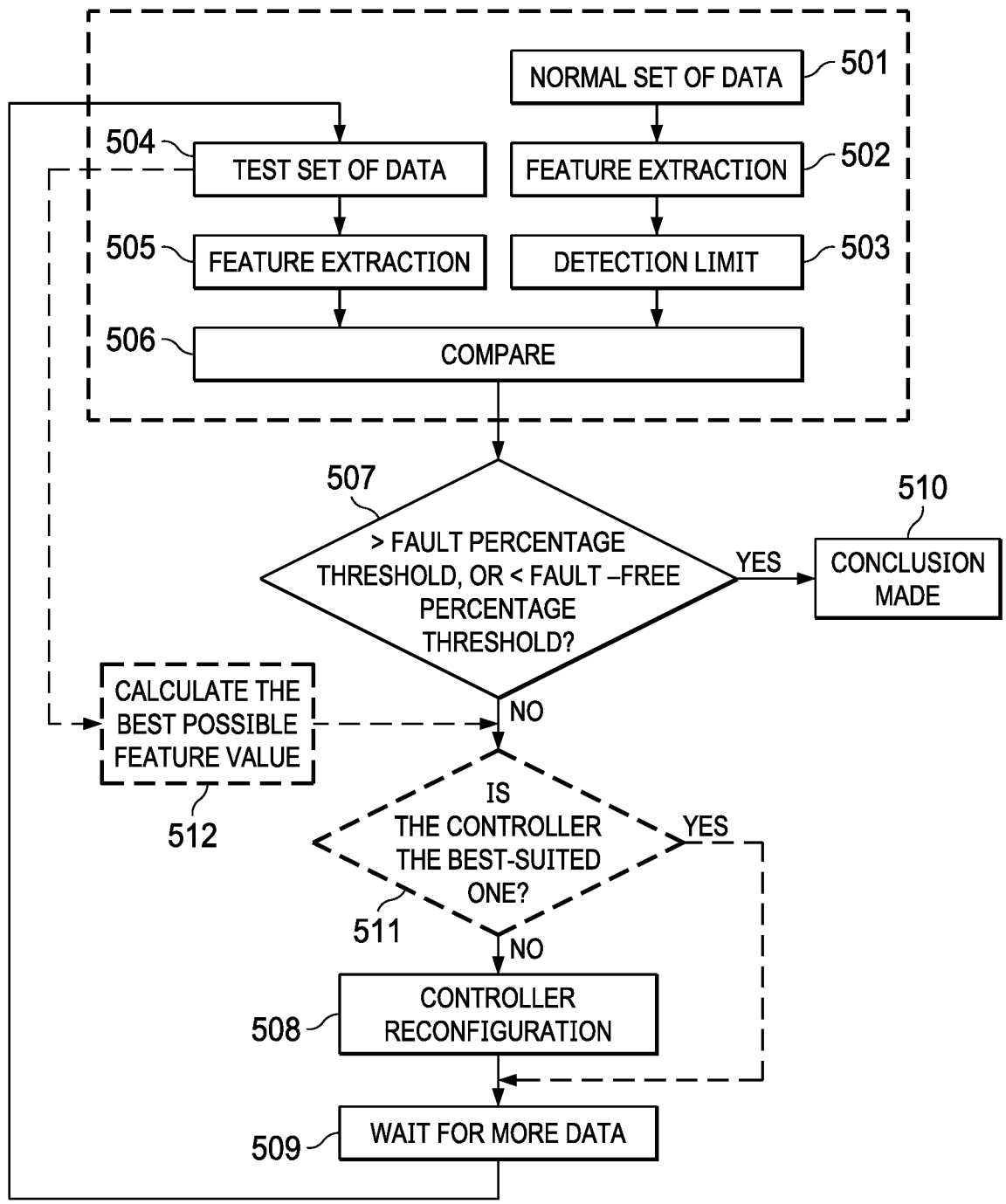
FIG. 5 is a flow chart of a method for detecting a fault in an oil and gas apparatus controlled by a controller according to one or more embodiments of the present disclosure.

FIG. 5 shows a flowchart of a method for detecting a fault in an oil and gas apparatus in accordance with one or more embodiments. Similar to operations 401 through 408, the method shown in FIG. 5 collects a normal set of data (operation 501), extracts a normal set of data points based on an extracted feature of the oil and gas apparatus (operation 502), determines a normal region that sets a detection limit (operation 503), collects a test set of data (operation 504), extracts a test set of data points based on an extracted feature (operation 505), compares the test set of data points to the normal region (operation 506), determines if a detection rate percentage is with thresholds (operation 507), and if the detection rate is between thresholds, the method reconfigures the controller (operation 508). The method also includes the iterative step of waiting for more data (operation 509) which returns to the method operation to collect a new test set of data (operation 504). Further, this method also specifically includes the conclusory operation that concludes if a fault is present or not depending on whether the percentage falls within either the fault or fault-free percentage threshold (operation 510). In an alternative embodiment, FIG. 5 shows that an optional controller evaluation may all be included. Particularly, the method may include calculating a best known feature value based on a known modeling of the oil and gas apparatus (operation 512) and determining if a corresponding model-based new controller is better suited and therefore should replace the current controller using the calculated best known feature value (operation 511).

In accordance with an exemplary embodiment, an oil and gas apparatus is considered free of fault when a detection rate is less than a fault-free percentage threshold (e.g., 30%), and the system is considered with fault only when detection rate is larger than a fault percentage threshold (e.g., 60%). Alternatively, in another embodiment, an oil and gas apparatus is considered free of fault when a detection rate is less than a fault-free percentage threshold (e.g., 5%), and the system is considered with fault only when detection rate is larger than a fault percentage threshold (e.g., 95%). Whether there is any fault is undetermined for any detection rate that falls in between the two thresholds. The detection rate is defined as the number of the test set of data points that are outside the normal operation range over the total number of test set of data points. In order to help determine if any fault is present, the controller is reconfigured as described below in FIGS. 6A-6C. The updated controller is still able to stabilize the system within acceptable control performance bounds (e.g., response time, damping ratio), while also possibly driving the detection rate to shift if any fault exists. Next, a new test set of data will be collected under the control of the updated controller. This process is run repeatedly for fault detection and monitoring purposes.

Figure 6A:
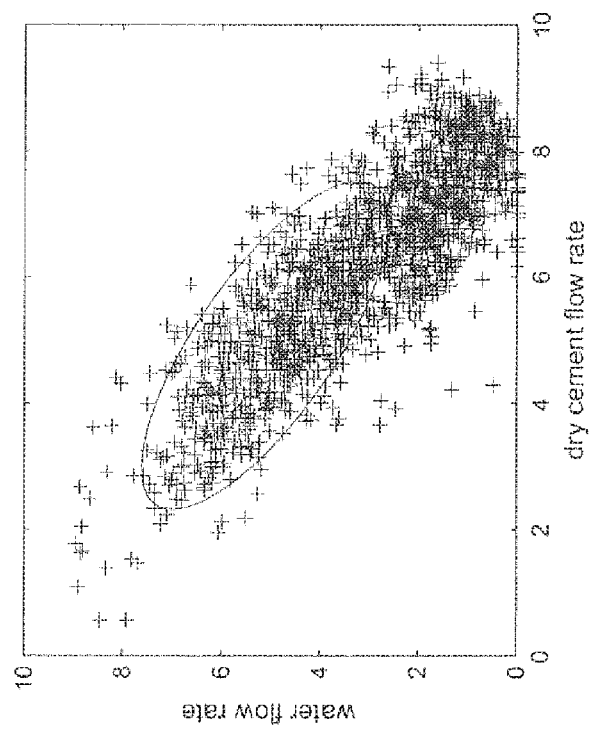
FIGS. 6A-6C are graphs plotting a normal set of data points and a test set of data points according to one or more embodiments of the present disclosure.

As described above, faults are specifically detected by checking the deviation of a test set of data from a normal operating region. In accordance with one or more exemplary embodiments, a normal set of data points are extracted based on one or more features of the oil and gas apparatus using principal component analysis (PCA), which is illustrated in FIG. 6A. The normal set of data points plotted using an 'x' are collected under normal operating conditions, and the test set of data points plotted using a '+' are collected under test operating conditions which may include the presence of a faulty condition. By applying the PCA technique, an ellipse, or control limit, that represents the normal operation region can be learned from the normal set of data points. Any test set of data points that fall outside the ellipse will be regarded as deviated from normal operating condition and can be considered faulty. For small magnitude faults (i.e., faults that drive a small number of the test set of data points to deviate little from the normal operation region), it is generally difficult to draw any conclusions. For example, as shown in FIG. 6A, many of the test set of data points (marked with a '+') which may be samples taken during a fault are still within the normal operation region limits. In order to improve fault detection rate, these test set of data points that are actually faulty samples need to be outside the normal operation region in sufficient number in order to accurately detect the fault. This can be done by reconfiguring the controller by adjusting one or more of the controller operating parameters. The adjusted operating parameter maximizes the fault effect on the performance of detectable features of the oil and gas apparatus. This allows for earlier diagnosis of faults within the oil and gas apparatus. If additional test sets of data suggest that the controller did not adjust operating parameters such that the test set of data points are driven to appear within the desired threshold ranges, then more iterations of reconfigurations may be implemented.

According to a specific exemplary embodiment, the oil and gas apparatus may be a cement mixing system, for example a cement mixing truck, which has a known modeling defining the normal operation region within which a normal set of data points would be plotted as shown in FIG. 6A by the points marked with 'x's. A model predictive controller (MPC) which has the known modeling is provided to control this oil and gas apparatus. This oil and gas apparatus (cement mixing truck) has two inputs (dry cement flow rate and water flow rate) and two outputs (level of the second tank and slurry density). In the known modeling, it is known that there is some air entering the system along with dry cement, but if the amount of air were to suddenly increase that would be considered a fault condition for this oil and gas apparatus. The fault condition can be caused by a hole forming in the cement feeding pipe. Alternatively, the fault condition can be caused by a loose or broken sealing element, a gap forming at a joint between system elements, or by the dry cement and/or water flow being provided with an increased proportional amount of air compared to the dry cement or water. For example, during operation the cement mixing truck may operate normally for a time. Then at some point air entering the system may suddenly increase which is mathematically modeled as a constant bias in the known modeling. In response, the MPC drives the water rate down to counteract the additional air and the dry cement rate up to compensate reduced density caused by the air in order to keep the oil and gas apparatus within desired system requirements and in a stable operating region. The fault effects on the water and dry cement rates are shown in FIG. 6A in which both variables are shown. Specifically, the air fault tends to move any of the test set of data collected during the presence of the fault to the right lower portion of the graph when plotted as shown in FIG. 6A. FIG. 6A also suggests that it is not easy to differentiate all the faulty samples from the previously collected normal set of data points, as many of the test set of data points collected during the fault condition lie in the normal operation range.

Figure 6B:
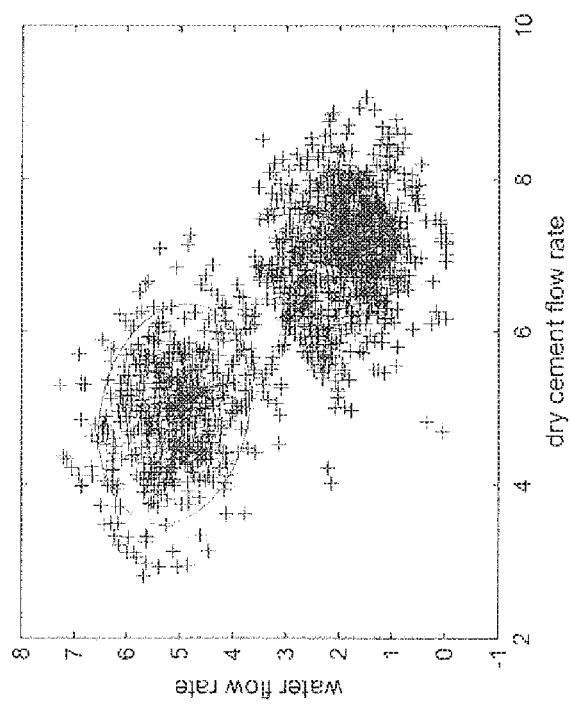
Figure 6C:
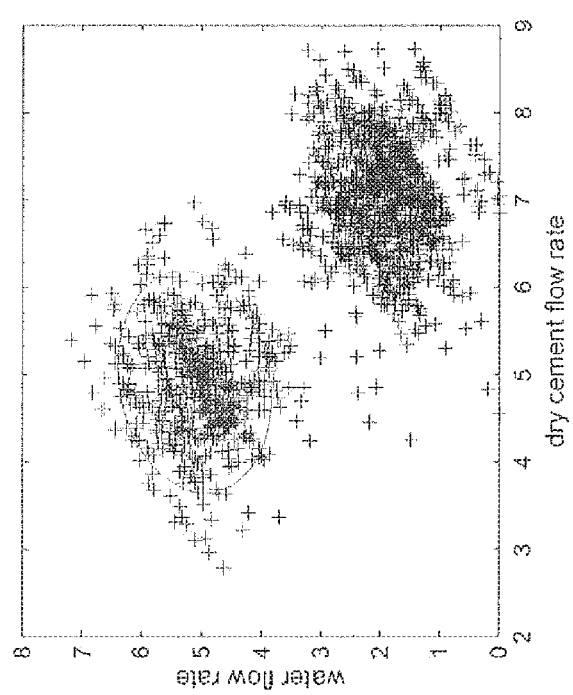

In order to improve the ability to detect the fault the test set of data that is to be collected can be driven outside the normal operation region by configuring the MPC by adjusting an operating parameter. For example, by examining the MPC settings, the weights for penalty of manipulated variables move rate in the MPC is changed from $$\begin{bmatrix} 1 & 0.8 \\ 0.8 & 1 \end{bmatrix}$$

to $$\begin{bmatrix} 1 & 0 \\ 0 & 1 \end{bmatrix}$$

so that the noise variance along the fault direction could be reduced for better separation. FIG. 6B, which is similar to FIG. 6A, is then plotted based on test set of data collected after the MPC is configured by adjusting the operating parameter weights as described above. As shown in FIG. 6B, it can be inferred from visual observation that more of the test set of data points which are faulty samples could be detected under the control of reconfigured MPC. Further, in another embodiment, in case of even larger fault, the MPC may be further reconfigured. With an adjusted operating parameter weight of $$\begin{bmatrix} 1 & -0.8 \\ -0.8 & 1 \end{bmatrix},$$

both clusters of normal and faulty data are re-oriented for even better fault detection results as shown in FIG. 6C.

In another embodiment, when the system model is available (e.g., the model in MPC), a best-possible value of the feature may be available. If it is found that the feature produced by the current controller is very close to the best possible value (e.g., within 5%), reconfiguring the controller may not be helpful in further improving fault detectability. Thus, one option is to wait for an increased fault magnitude. For instance, in the example above, if the best achievable variance along the fault direction could be calculated from test set of data, which still does not indicate a fault, then waiting for oil and gas apparatus fault to increase is an option. Particularly, if the water/dry-cement flow rate plot suggests that current variance is close to the theoretical minimum value of variance, the current controller can be kept until the test set of data shows a smaller minimum value or a larger fault magnitude.

In another exemplary embodiment, another form of controller may be used. For example, an observer-based state-feedback controller is used to control the oil and gas apparatus. The oil and gas apparatus may be, for example, a cement mixing system. In this embodiment, the controller is reconfigured by adjusting an operating parameter, for example, an observer gain when searching for a fault. For instance, the original observer gain is $$K = \begin{bmatrix} 0.5 \\ 0.6 \end{bmatrix},$$

while the new adjusted observer gain may be changed to $$K = \begin{bmatrix} 0.55 \\ 0.65 \end{bmatrix}.$$

An extra test set of data collected with the reconfigured controller would suggest if this adjustment of the operating parameter has been adjusted in the right direction. Particularly, the extra test set of data points collected would be plotted and found to have been driven further out of the normal operation range. In this case, the direction is right, and the observer gain may be further modified to $$K = \begin{bmatrix} 0.6 \\ 0.7 \end{bmatrix}$$

until there is no further fault detection improvements, Alternatively, if the direction is wrong in that the extra test set of data points are driven such that they fall further within the normal operation range, the observer gain can be reduced to $$K = \begin{bmatrix} 0.45 \\ 0.55 \end{bmatrix}.$$

In other embodiments, a fault may be nonlinear for a particular oil and gas apparatus such as a slack valve. For example, the characteristics of the slack valve include a deadband when the direction of valve movement is changed. Further, the valve fault is easier to reveal under higher frequency. Therefore, the controller is reconfigured by adjusting an operating parameter such as frequency since the deadband is more easier observed at differing frequencies. Particularly, the controller is able to drive the system from one frequency to another, where deadband is easier to be observed. In another embodiment, the deadband is analyzed using a controlled output—controller output (pv/op) plot when having noise in the system. Further, quantitative analysis could be performed using non-gaussianity index (NGI) or nonlinearity index (NLI).

In accordance with one or more embodiments, the above discussed methods provide for fault detection in its early stage by reconfiguring the controller so that the oil and gas apparatus remains under control while faults can be diagnosed more easily by the effect the reconfiguration has on collected data. The method of reconfiguring the controller can be applied to oil and gas processing equipment that has an oil and gas apparatus control system which can also be called a health monitoring module. It can warn the operator earlier than existing health monitoring systems and software. This can reduce the potential non-productive time of services and equipment.

It should be apparent from the foregoing that embodiments of an invention having significant advantages have been provided. While the embodiments are shown in only a few forms, the embodiments are not limited but are susceptible to various changes and modifications without departing from the spirit thereof.

For example, in an alternative embodiment, a method of detecting a fault in an oil and gas apparatus controlled by a controller is provided. The method includes collecting a test set of data using a sensor proximate to an oil and gas apparatus during the operation of the oil and gas apparatus under test operating conditions, the test set of data being associated with an operating parameter of the controller, determining a percentage of the test set of data that falls outside a normal operation region of the oil and gas apparatus, and configuring the controller in response to the percentage being between a fault-free percentage threshold and a fault percentage threshold.

In another embodiment, the method further includes reconfiguring the controller recursively until the test set of data diverges from the normal operation region causing the percentage of test set of data to be equal to or greater than the fault percentage threshold indicating that the fault has been detected.

In another embodiment, the method further includes determining a normal operation region based on a normal set of data collected during the operation of the oil and gas apparatus within normal operating conditions, the normal set of data being associated with the operating parameter of the controller.

In another embodiment, determining a normal operation region includes extracting a normal set of data points based on a feature of the oil and gas apparatus from the normal set of data, and determining the normal operation region based on a mapping of the normal set of data points.

In another embodiment, determining the percentage of the test set of data that falls outside the normal operation region includes extracting a test set of data points based on a feature of the oil and gas apparatus from the test set of data, mapping the extracted test set of data points and the normal operation region, and determining the percentage of the test set of data points that fall outside the normal operation region.

In another embodiment, configuring the controller in response to the percentage being between the fault-free percentage threshold and the fault percentage threshold includes adjusting the operating parameter of the controller, and maintaining an oil and gas apparatus response using the operating parameter within system requirements that keep the oil and gas apparatus within a stable operating region that includes at least one or more of mechanical system stability, chemical system stability, and electrical system stability.

In another embodiment, configuring the controller in response to the percentage being between the fault-free percentage threshold and the fault percentage threshold includes selecting a new controller, replacing the controller with the new controller, adjusting the new controller using the operating parameter, and maintaining an oil and gas apparatus response using the operating parameter within system requirements that keep the oil and gas apparatus within a stable operating region that includes at least one or more of mechanical system stability and electrical system stability.

In another embodiment, the controller is a model predictive control (MPC) controller, and wherein the operating parameter is one or more selected from a group consisting of a tuning weight parameter and a predication horizon control parameter.

In another embodiment, the controller is a proportional-integral-derivative (PID) controller, and wherein the operating parameter is one or more selected from a group consisting of a proportional gain tuning parameter, an integral gain tuning parameter, and a derivative gain tuning parameter.

In another embodiment, the oil and gas apparatus is one selected from a group consisting of a cement mixing system, drilling fluid pump, logging while drilling tool, bottom-hole assembly, drill bit, blowout preventer, rotating control device, recirculation equipment, casing, drill string, drilling kelly, and supply pipe.

In another embodiment, the normal operation region is defined by a center data point and one or more variance threshold vectors extending from the center data point.

In another embodiment, the fault-free percentage threshold is set to 5% or less of the test set of data being outside the normal operation region, and wherein the fault percentage threshold is set to 95% or more of the test set of data is outside the normal operation region.

In another embodiment, the fault-free percentage threshold is set to 30% or less of the test set of data being outside the normal operation region, and wherein the fault percentage threshold is set to 60% or more of the test set of data is outside the normal operation region.

In another embodiment, the sensor is one selected from a group consisting of a depth-tracking sensor, flow-in tracking sensor, pressure-tracking sensor, flow-out tracking sensor, drill-monitor sensor, pit-monitor sensor, gas-detection sensor, fluid temperature sensor, fluid density sensor, and fluid conductivity sensor.

Further in an alternative embodiment, an oil and gas apparatus control system for detecting a fault in the oil and gas apparatus is provided. The oil and gas apparatus control system includes a sensor that collects a test set of data during the operation of the oil and gas apparatus control system under test operating conditions, the test set of data being associated with an operating parameter, a controller that determines, using a processor, a percentage of the test set of data that falls outside a normal operation region, and configures the operating parameter of the controller in response to the percentage being between a fault-free percentage threshold and a fault percentage threshold, and an oil and gas apparatus controlled by the controller from which the sensor collects the test set of data.

In another embodiment, the oil and gas apparatus is one selected from a group consisting of a cement mixing system, a drilling fluid pump, logging while drilling tool, bottom-hole assembly, drill bit, blowout preventer, rotating control device, recirculation equipment, casing, drill string, drilling kelly, and supply pipe.

In another embodiment, the controller is one selected from a group consisting of a proportional-integral-derivative (PID) controller and a model predictive control (MPC) controller.

In another embodiment, the sensor is one selected from a group consisting of a depth-tracking sensor, flow-in tracking sensor, pressure-tracking sensor, flow-out tracking sensor, drill-monitor sensor, pit-monitor sensor, gas-detection sensor, fluid temperature sensor, fluid density sensor, and fluid conductivity sensor.

Further in an alternative embodiment, a controller configured to control an oil and gas apparatus and detect a fault in the oil and gas apparatus is provided. The controller includes an input device that receives a test set of data during the operation of the system under test operating conditions, the test set of data being associated with an operating parameter of the controller, a data reservoir that stores the test set of data, a normal set of data, a normal operation region, a fault-free percentage threshold, and a fault percentage threshold, a processor that determines a percentage of the test set of data that falls outside the normal operation region, and configures the operating parameter of the controller in response to the percentage being between the fault-free percentage threshold and the fault percentage threshold, and an output device that transmits the operating parameter to the system.

In another embodiment, the controller is one selected from a group consisting of a proportional-integral-derivative (PID) controller and a model predictive control (MPC) controller.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A method of detecting a fault in an oil and gas apparatus controlled by a controller, the method comprising:
    collecting a test set of data using a sensor proximate to an oil and gas apparatus during the operation of the oil and gas apparatus under test operating conditions, the test set of data being associated with an operating parameter of the controller;
    determining a percentage of the test set of data that falls outside a normal operation region of the oil and gas apparatus; and
    configuring the controller in response to the percentage being between a fault-free percentage threshold and a fault percentage threshold, wherein the percentage being between the fault-free percentage threshold and the fault percentage threshold is indicative of an inconclusive finding of the oil and gas apparatus.

2. The method of claim 1, further comprising:
    reconfiguring the controller recursively until the test set of data diverges from the normal operation region causing the percentage of test set of data to be equal to or greater than the fault percentage threshold indicating that the fault has been detected.

3. The method of claim 1, further comprising:
    determining a normal operation region based on a normal set of data collected during the operation of the oil and gas apparatus within normal operating conditions, the normal set of data being associated with the operating parameter of the controller.

4. The method of claim 3, wherein determining a normal operation region comprises:
    extracting a normal set of data points based on a feature of the oil and gas apparatus from the normal set of data; and
    determining the normal operation region based on a mapping of the normal set of data points.

5. The method of claim 1, wherein determining the percentage of the test set of data that falls outside the normal operation region comprises:
    extracting a test set of data points based on a feature of the oil and gas apparatus from the test set of data;
    mapping the extracted test set of data points and the normal operation region; and
    determining the percentage of the test set of data points that fall outside the normal operation region.

6. The method of claim 1, wherein configuring the controller in response to the percentage being between the fault-free percentage threshold and the fault percentage threshold comprises:
    adjusting the operating parameter of the controller; and
    maintaining an oil and gas apparatus response using the operating parameter within system requirements that keep the oil and gas apparatus within a stable operating region that includes at least one or more of mechanical system stability, chemical system stability, and electrical system stability.

7. The method of claim 1, wherein configuring the controller in response to the percentage being between the fault-free percentage threshold and the fault percentage threshold comprises:
    selecting a new controller;
    replacing the controller with the new controller;
    adjusting the new controller using the operating parameter; and
    maintaining an oil and gas apparatus response using the operating parameter within system requirements that keep the oil and gas apparatus within a stable operating region that includes at least one or more of mechanical system stability and electrical system stability.

8. The method of claim 1,
    wherein the controller is a model predictive control (MPC) controller, and
    wherein the operating parameter is one or more selected from a group consisting of a tuning weight parameter and a predication horizon control parameter.

9. The method of claim 1,
    wherein the controller is a proportional-integral-derivative (PID) controller, and
    wherein the operating parameter is one or more selected from a group consisting of a proportional gain tuning parameter, an integral gain tuning parameter, and a derivative gain tuning parameter.

10. The method of claim 1, wherein the oil and gas apparatus is one selected from a group consisting of a cement mixing system, drilling fluid pump, logging while drilling tool, bottom-hole assembly, drill bit, blowout preventer, rotating control device, recirculation equipment, casing, drill string, drilling kelly, and supply pipe.

11. The method of claim 1, wherein the normal operation region is defined by a center data point and one or more variance threshold vectors extending from the center data point.

12. The method of claim 1,
    wherein the fault-free percentage threshold is set to 5% or less of the test set of data being outside the normal operation region; and
    wherein the fault percentage threshold is set to 95% or more of the test set of data is outside the normal operation region.

13. The method of claim 1,
    wherein the fault-free percentage threshold is set to 30% or less of the test set of data being outside the normal operation region; and
    wherein the fault percentage threshold is set to 60% or more of the test set of data is outside the normal operation region.

14. The method of claim 1, wherein the sensor is one selected from a group consisting of a depth-tracking sensor, flow-in tracking sensor, pressure-tracking sensor, flow-out tracking sensor, drill-monitor sensor, pit-monitor sensor, gas-detection sensor, fluid temperature sensor, fluid density sensor, and fluid conductivity sensor.

15. An oil and gas apparatus control system for detecting a fault in the oil and gas apparatus, the oil and gas apparatus control system comprising:
- a sensor that collects a test set of data during the operation of the oil and gas apparatus control system under test operating conditions, the test set of data being associated with an operating parameter;
- a controller that determines, using a processor, a percentage of the test set of data that falls outside a normal operation region, and configures the operating parameter of the controller in response to the percentage being between a fault-free percentage threshold and a fault percentage threshold, wherein the percentage being between the fault-free percentage threshold and the fault percentage threshold is indicative of an inconclusive finding of the oil and gas apparatus; and
- an oil and gas apparatus controlled by the controller from which the sensor collects the test set of data.

16. The oil and gas apparatus control system of claim 15, wherein the oil and gas apparatus is one selected from a group consisting of a cement mixing system, a drilling fluid pump, logging while drilling tool, bottom-hole assembly, drill bit, blowout preventer, rotating control device, recirculation equipment, casing, drill string, drilling kelly, and supply pipe.

17. The oil and gas apparatus control system of claim 15, wherein the controller is one selected from a group consisting of a proportional-integral-derivative (PID) controller and a model predictive control (MPC) controller.

18. The oil and gas apparatus control system of claim 15, wherein the sensor is one selected from a group consisting of a depth-tracking sensor, flow-in tracking sensor, pressure-tracking sensor, flow-out tracking sensor, drill-monitor sensor, pit-monitor sensor, gas-detection sensor, fluid temperature sensor, fluid density sensor, and fluid conductivity sensor.

19. A controller configured to control an oil and gas apparatus and detect a fault in the oil and gas apparatus, the controller comprising:
- an input device that receives a test set of data during the operation of the system under test operating conditions, the test set of data being associated with an operating parameter of the controller;
- a data reservoir that stores the test set of data, a normal set of data, a normal operation region, a fault-free percentage threshold, and a fault percentage threshold;
- a processor that determines a percentage of the test set of data that falls outside the normal operation region, and configures the operating parameter of the controller in response to the percentage being between the fault-free percentage threshold and the fault percentage threshold, wherein the percentage being between the fault-free percentage threshold and the fault percentage threshold is indicative of an inconclusive finding of the oil and gas apparatus; and
- an output device that transmits the operating parameter to the system.

20. The controller of claim 19, wherein the controller is one selected from a group consisting of a proportional-integral-derivative (PID) controller and a model predictive control (MPC) controller.

* * * * *